United States Patent [19]

Chapman, Jr. et al.

[11] Patent Number: 5,010,130

[45] Date of Patent: Apr. 23, 1991

[54] HIGH MELT VISCOSITY FLUOROPOLYMER PROCESS AID

[75] Inventors: George R. Chapman, Jr., Media, Pa.; Lee A. Gorthey; Donnan E. Priester, both of Wilmington, Del.

[73] Assignee: E. I. Du Pont de Nemours and Company, Wilmington, Del.

[21] Appl. No.: 524,260

[22] Filed: May 15, 1990

[51] Int. Cl.$^5$ .................. C08K 3/36; C08K 3/00; C08L 23/02; C08L 27/16; C08L 27/18
[52] U.S. Cl. .................. 524/445; 524/520; 524/451; 525/199; 525/200
[58] Field of Search .............. 524/445, 520; 525/199, 525/200

[56] References Cited

U.S. PATENT DOCUMENTS 4,904,735 2/1990 Chapman et al. .................. 525/199

FOREIGN PATENT DOCUMENTS 64-74247 3/1989 Japan .

OTHER PUBLICATIONS

Smedt et al.–"The Processing Benefits of Fluoroelastomer Application in LLDPE"–Plastics & Rubber Processing & App., vol. 8, No. 1, 1987 (pp. 11–16).
Fronek et al.–"Tailoring Processing Additives for High Density Polyethylene Applications"–ANTEC '90, (pp. 1172 to 1177), 1990.

*Primary Examiner*—Carman J. Seccuro

[57] ABSTRACT

Improved polymer blend composition having improved processibility and comprising:
(a) a major portion of a difficultly melt-processible polymer, and
(b) a minor portion of:
  (1) at least an effective amount, to improve processibility, of a fluorocarbon copolymer which at the melt-processing temperature of (a) is either in a melted form if crystalline, or is above its glass transition temperature if amorphous, and
  (2) at least an effective amount, to improve processibility, of at least one tetrafluoroethylene homopolymer or copolymer of tetrafluoroethylene and at least one monomer copolymerizable therewith, wherein the mole ratio of fluorine to hydrogen is at least 1:1, and which is solid at the melt processing temperature of (a), said composition further characterized in that it contains an abrasive inorganic filler that retards the processibility of (a) in the presence of (b)(1) and (b)(2), the improvement consisting of minimizing the retarding effect of the inorganic filler by employing (b)(1) having an apparent viscosity at 200° C. of at least about 400 Pa.s measured at an apparent shear stress of 360 KPa.

72 Claims, No Drawings

HIGH MELT VISCOSITY FLUOROPOLYMER PROCESS AID

FIELD OF THE INVENTION

This invention relates to an improved process aid composition for the melt extrusion of difficultly melt-processible (DMP) polymers.

BACKGROUND

In the melt extrusion of polymer resins there are often flow regimes, determined by the rheological properties of the particular resin, wherein anomalous flow behavior occurs, leading to imperfections on the extrudate surfaces. Such imperfections, commonly called melt fracture, appear in different forms. The so-called "sharkskin" fracture occurs at lower shear rates and appears as a general, finely-structured and uniform roughness. In a blown-film extrusion, sharkskin fracture may appear as an undesirable herringbone pattern, reducing clarity and giving a dull surface. In practice this may occur at uneconomically low extrusion rates. At higher shear rates flow often becomes unstable and a non-uniform stick-slip melt fracture results, wherein alternating bands of glossy surface and sharkskin fracture appear. This behavior is especially undesirable in wire coating and in tube and pipe extrusions as well as in blown-film applications.

In order to improve the extrusion behavior of hydrocarbon polymer resins through metal dies it is well known, for example, as disclosed in U.S. Pat. No. 3,125,547, to incorporate a small quantity of a fluoropolymer that is melted or above its glass transition temperature at the melt processing temperature, usually 120°-300° C. Such a process aid not only significantly reduces melt fracture but it also gives significant reduction in die pressure, thus providing cost-saving reductions in extruder power requirements. Widely used, commercially available process aids of this type are copolymers of vinylidene fluoride and hexafluoropropylene having Mooney Viscosities of 30-40 measured at 121° C.

Japanese Kokai 1,074,247 discloses the use of combinations of fluoropolymers melting at temperatures below 100° C together with fluoropolymers melting in the range 120°-300° C.

U.S. Pat. No. 4,904,735 discloses a process aid for a difficultly melt-processible (DMP) polymer, the process aid comprising, in combination, a fluorocarbon copolymer that, at the process temperature, is above its melting point or glass transition temperature together with a tetrafluoroethylene homopolymer or copolymer that, at the process temperature, is below its melting point and is solid.

Although not wishing to be legally bound by this explanation, it can be postulated that the fluorocarbon copolymer forms a thin lubricating layer at the die surface, over which the DMP polymer melt can flow without sticking, thus eliminating the undesirable melt fracture. However, in commercial extrusions it is often a practice to add to the DMP polymer an abrasive inorganic adjuvant (filler), for example, up to 1 wt. % of one or more pigments, or a finely divided talc or silica as an antiblock agent. This practice can greatly diminish, or completely negate, some or all of the beneficial effects achieved by means of the aforesaid combination process aid. It can be further postulated that the abrasive agent physically scrubs away the lubricating layer of fluorocarbon copolymer that is relatively weakly adhered to the die surface.

It is an object of this invention to provide a process aid that is resistant to the negative effects of abrasive inorganic fillers.

SUMMARY OF THE INVENTION

In summary this invention resides in a polymer blend composition having improved processibility and comprising:
 (a) a major portion of a difficultly melt-processible (DMP) polymer, and
 (b) a minor portion of:
  (1) at least an effective amount, to improve processibility, of a fluorocarbon copolymer which at the melt-processing temperature of (a) is either in a melted form if crystalline, or is above its glass transition temperature if amorphous, and
  (2) at least an effective amount, to improve processibility, of at least one tetrafluoroethylene homopolymer or copolymer of tetrafluoroethylene and at least one monomer copolymerizable therewith, wherein the mole ratio of fluorine to hydrogen is at least 1:1, and which is solid at the melt-processing temperature of
 (a), said composition further characterized in that it contains an abrasive inorganic filler that retards the processibility of the DMP polymer in the presence of (b)(1) and (b)(2), the improvement consisting of minimizing the retarding effect of the inorganic filler by employing (b)(1) having an apparent viscosity at 200.C of at least about 400 Pa s measured at a shear stress of 360 KPa.

DETAILED DESCRIPTION OF THE INVENTION

It is known from U.S. Pat. No. 4,904,735 that improvements in the extrusion behavior of DMP polymers are obtained by the use of certain combinations of fluoropolymers that are described as type (1) and type (2) polymers, defined therein and herein as follows. Type (1) fluoropolymers are those that, at the melt processing temperature, are above their crystalline melting point, if crystalline, or above their glass transition temperatures, if amorphous, and are thus molten during processing. Type (2) fluoropolymers are those that, at the melt processing temperature, are below their crystalline melting point or glass transition temperature and are, therefore, solid.

With respect to the fluorocarbon polymers of both types, it has been independently discovered that one or both must have an effective amount of polar functional groups selected from —COF, —SO$_2$F, —SO$_3$M, —COOR, and —COOM, wherein R is a C$_1$—3 alkyl group and M is hydrogen or a metal or ammonium cation. Although not wishing to be legally bound by this explanation, it is believed that this functionality provides a site on the polymer chain for chemical and-/or physical bonding of the fluorocarbon polymer to the metal die surface. Such functionality can be introduced into the fluorocarbon polymer: (a) as polymer chain end groups introduced during polymerization; (b) by copolymerization of a functional-group-containing comonomer; or (c) by subjecting the polymer to ionizing radiation.

The term "extrusion behavior" is intended to include, individually or in combination, such parameters as the die pressure reached during extrusion and the resultant power requirements, the operating melt temperatures required, and the maximum extrusion rates that can be achieved while maintaining melt stability and good extrudate surface quality. The relative degree of beneficial effect of the process aid in reducing die pressure is conveniently evaluated by determining the percent reduction in die pressure, ΔP, during extrusion of the blend composition, by means of the equation $$\Delta P = \frac{100(P_{resin} - P_{blend})}{P_{resin}}$$

wherein $P_{resin}$ is the die pressure of the unmodified DMP polymer and $P_{blend}$ is the die pressure of the DMP polymer containing the process aid of this invention, all carried out under the same set of extrusion conditions (except for the observed die pressures).

In the absence of abrasive inorganic fillers, it has been found that ΔP is not very much dependent on the melt viscosity of the type (1) component when type (1)/type (2) combinations are used. When abrasive inorganic fillers, such as pigments or antiblock agents, are added to the resin compositions containing type (1)/type (2) combinations of fluoropolymer process aids, ΔP can be significantly diminished, by as much as 30–50%, when commonly commercially-employed type (1) fluorocarbon copolymers are used. It has been discovered, in contrast to the above, that when the type (1) fluorocarbon copolymer has a high melt viscosity, then ΔP values of blends containing the abrasive inorganic fillers are significantly greater than when those commonly used and of low melt viscosity are employed.

Accordingly, the type (1) fluorocarbon copolymer of this invention is defined as one that is fluid, that is, it is above its melting point if crystalline, or above its glass transition temperature if amorphous, at the melt processing temperature of the DMP polymer, and has an apparent viscosity at 200.C of at least about 400, preferably at least about 1000, more preferably at least about 2000 Pa s measured at an apparent shear stress of 360 KPa. Rheological properties are measured by standard piston rheometer techniques and the apparent viscosity, $\eta$ app, is determined by the relationship $$\eta_{app} = \frac{\tau \ (KPa)}{\gamma \ (sec^{-1})}$$

wherein $\tau$ is the apparent shear stress at 360 KPa and $\gamma$ is the apparent shear rate. The apparent shear stress of 360 KPa is selected as being representative of the shear stresses at the die wall during extrusion of such resins as, for example, linear low density polyethylene (LLDPE). The practical upper limit of $\eta$ app will be determined by the viscosity, under the existing shear stresses of the extrusion, at which the type (1) fluorocarbon copolymer is no longer capable of being smeared out to coat the metal die surface.

With respect to the chemical composition of the type (1) fluorocarbon copolymers it is preferred, but not essential, that it have a fluorine to carbon ratio of at least 1:1.5. Fluorinated monomers which give suitable copolymers include vinylidene fluoride, chlorotrifluoroethylene, hexafluoropropylene, 1- or 2-hydropentafluoropropylene, tetrafluoroethylene and perfluoro(alkyl vinyl ethers). Examples of type (1) fluorocarbon copolymers that may be employed in this invention include copolymers of vinylidene fluoride and a monomer selected from hexafluoropropylene and 1-or 2-hydropentafluoropropylene; copolymers of vinylidene fluoride, tetrafluoroethylene and hexafluoropropylene or 1- or 2-hydropentafluoropropylene; copolymers of tetrafluoroethylene and propylene and, optionally, vinylidene fluoride; copolymers of tetrafluoroethylene and a perfluoro(alkyl vinyl ether), preferably perfluoro(methyl vinyl ether), optionally containing a small amount of a curesite monomer, all of which are known in the art. When these copolymers contain certain mole ratios of polymerized comonomers, then the glass transition temperature is near or below 0° C.; such copolymers are useful elastomers, many of which are readily available articles of commerce. Preferred type (1) fluorocarbon copolymers are copolymers of vinylidene fluoride and hexafluoropropylene, copolymers of vinylidene fluoride, hexafluoropropylene and tetrafluoroethylene, and copolymers of tetrafluoroethylene and perfluoro(methyl vinyl ether).

Useful concentrations of type (1) fluorocarbon copolymer are in the range 0.005–0.5 wt. %, preferably, for matters of economy, in the range 0.005–0.1 wt. %.

The fluorocarbon homopolymer or copolymers of type (2) that are solid at the melt processing temperature of the DMP polymer include homopolymers of tetrafluoroethylene and copolymers of tetrafluoroethylene with certain copolymerizable comonomers. The selection of the fluorocarbon polymer of type (2) is not limited to high viscosity polymers, nor is it limited to how much copolymerizable comonomer is present, except as stated above. For example, if excessive amounts of comonomer are used, the polymer will not be solid at the temperature used for melt processing the DMP polymer; or, if the copolymer has too low a molecular weight, it may not be solid at the temperature used for melt processing the DMP polymer. Suitable tetrafluoroethylene homopolymers are those that do not fibrillate to a substantial degree under shearing conditions. High molecular weight tetrafluoroethylene homopolymers that been subjected to ionizing radiation, such as disclosed in U.S. Pat. No. 3,766,031, are also operable herein. Suitable monomers copolymerizable with tetrafluroethylene to give melt-processible copolymers are ethylene, perfluoroolefins, such as hexafluoropropylene, and perfluoro(alkyl vinyl ethers), such as perfluoro(propyl vinyl ether), and perfluoro(alkyl vinyl ethers) which have certain functional groups, such as —SO₂F or —COOCH₃. More than one comonomer may be used in the preparation of the tetrafluoroethylene copolymer provided all the aforesaid requirements are met. Especially preferred type (2) fluorocarbon polymers are tetrafluoroethylene homopolymers that have been treated with 2–80 Mrads of ionizing radiation and copolymers of tetrafluoroethylene and hexafluoropropylene.

Useful concentrations of type (2) fluorocarbon polymer process aid component are in the range 0.005–0.5 wt. %, preferably, for matters of economy, in the range 0.005–0.1 wt. %.

The weight ratio of component (b)(1) to component (b)(2) in the process aid of the invention is within the range 5:95 to 95:5, preferably 20:80 to 90:10.

Difficultly melt-processible (DMP) polymers of the composition of the invention are defined as polymers that either require uneconomically high extrusion pressure or temperature for extrusion, or extrude with unacceptable surface characteristics, for example, melt fracture, such that the surfaces of the extrudate are blemished under conditions that would be otherwise technically feasible or economically attractive.

When the DMP polymer is a hydrocarbon polymer used in film applications, it generally will have a melt index (ASTM D-1238) at 190° C of 5.0 or less, preferably 2.0 or less; for other applications, higher melt indices are operable. Such hydrocarbon polymers may comprise an elastomeric copolymer of ethylene and propylene and, optionally, a non-conjugated diene monomer, for example, 1,4-hexadiene, or, in general, any thermoplastic hydrocarbon polymer obtained by the homopolymerization or copolymerization of one or more monoolefins of the formula $CH_2=CHR'$, wherein R' is H or an alkyl radical, usually of not more than eight carbon atoms. In particular, this invention is applicable to the following: polyethylene, both of the high density type and the low density type having densities within the range 0.89 to 0.97; polypropylene; polybutene-1; poly(3-methylbutene); poly(4-methylpentene); and linear low density copolymers of ethylene and an alpha-olefin, such as propylene, butene-1, octene-1, decene-1 or octadecene-1. Other DMP polymers include copolymers of alpha-olefins, particularly ethylene, and vinyl esters, such as vinyl acetate and vinyl propionate; (meth)acrylic esters, such as methyl or ethyl (meth)acrylate; or (meth)acrylic acids and their (ionomeric) metal salts. Also operable are vinylaromatic polymers, such as polystyrene; and the invention is applicable to blends of DMP hydrocarbon polymers.

Because of the different melt characteristics of the different hydrocarbon polymers mentioned, the addition of the types (1) and (2) fluorocarbon polymers may be of greater value in some hydrocarbon polymers than in others. Thus, hydrocarbon polymers such as polypropylene and branched polyethylene, that are not of high molecular weight have good melt flow characteristics even at low temperatures, so that surface roughness and other surface defects can be avoided by adjustment of extrusion conditions. Such hydrocarbon polymers may not require the use of the fluorocarbon polymer additives of this invention, or be noticeably improved by them, except under unusual, adverse extrusion conditions. Such hydrocarbon polymers, therefore, are considered herein as not difficultly melt-processible polymers. However, other polymers such as high molecular weight, high density polyethylene or linear low density polyethylene copolymers, particularly those with narrow molecular weight distributions, do not have this degree of freedom in the variation of extrusion conditions and it is particularly with these resins that remarkable improvements in the surface quality of the extruded product are obtained with compositions containing the described type (1) and type (2) fluorocarbon polymers.

It will also be recognized by one skilled in the art that it may not be possible to achieve, simultaneously, reduced die pressure, increased throughput and improved surface quality to the maximum extent at given concentration of types (1) and (2). Thus, one might elect to attain maximum improvement in one parameter, in particular, at the expense of corresponding improvements in other parameters. For example, increased output of extrudate with high quality surface characteristics may not necessarily be accompanied by reduced die pressure. The best set of conditions will be determined by the specific requirements of the extrusion.

Addition of the type (1) and type (2) process aid components to the DMP polymer can be accomplished by any of the means heretofore used for the addition of modifiers to such polymers. For example, they can be added separately to, for example, a hydrocarbon polymer, on a rubber compounding mill or in a Banbury or other mixer, or in a mixing extruder; in all of these means the components are uniformly distributed throughout the host polymer. It is also possible to dry blend the two components with the host polymer in the solid state, and then effect uniform distribution of the components in the melt extruder in the fabrication stage by using an extruder screw with good mixing capability.

Alternatively, masterbatch dispersions (mixtures) of the type (1) and (2) components in a diluent polymer, either together or separately, can be physically blended with the DMP polymer before extrusion, or they can be metered to the feed section of the extruder by appropriate devices. The diluent polymer can be a DMP polymer, or it can be a melt-processible polymer that does not substantially deleteriously affect the interaction of the aforesaid components (a), (b)(1) and (b)(2) in achieving the beneficial effects of the invention. In preparing such masterbatches the amounts of type (1) and (2) components will usually be such that they provide 1-10 wt. %, preferably 1-3 wt. % of the masterbatch Further to the above, regarding the need to avoid adversely affecting the beneficial effects of the invention in preparing the masterbatch, the concentrations of types (I) and (2), as well as the diluent polymer, will be selected so as to achieve good mixing and fine particle size distribution of all of the ingredients. A preferred method of addition of the process aid to the DMP polymer is by means of a masterbatch containing both type (1) and (2) components.

The abrasive inorganic filler of the composition of the invention includes inorganic pigments, such as titanium dioxide, carbon black and the like, and antiblock agents, such as silica, finely divided clays and pulverulent glass beads. Antiblock agents usually are present at concentrations of about 0.05-2 wt. %, but are preferably present at their minimum effective concentrations of about 0.05-0.5 wt % to minimize the deleterious effect of the filler. A preferred method of addition of the abrasive inorganic additive is by means of a separate masterbatch of 2-20 wt. % of the filler in the DMP polymer or in another resin that does not substantially or deleteriously affect the performance of the composition. When the abrasive filler is a pigment, for example, $TiO_2$, it usually is present at higher concentrations, for example, up to 5 wt. % in the DMP polymer and up to 60 wt. % in the masterbatch.

The evaluations reported below were carried out on a C. W. Brabender Instruments, Inc. Computerized Plasti-Corder equipped with a 19.1 mm. (¾ in.) diameter extruder with a 25/1 length/diameter ratio. The chromium plated screw had ten feed flights, 10 compression flights with a compression ratio of 3:1, and 5 metering flights. Operating parameters were controlled by four independent heating zones, four pressure transducers and a torque-measuring drive unit with 1-120 rpm capability. The instrument was equipped with software for rheometric extrusion testing A horizontal ribbon (tape) die body made of #416 ferritic stainless steel, supplied by C. W. Brabender and designed to accept chromium plated die inserts such that the exit width was 2.54 cm. (1.0 in.), the land length was 1.016 cm. (0.4 in.) and the die gap was a nominal 0.508 mm. (0.02 in.) was used. The die inserts were used as received after wiping with ScotchBrite ® scouring pads and soaking in acetone to remove surface contaminants.

In operation, the required machine conditions were set and the polymer resin then extruded at 60 rpm until equilibrium (constant throughput and constant die pressure) was reached. For a linear low density polyethylene (LLDPE) with a melt index at 190 C of 1, extrusion at 60 rpm gave a throughput of about 25-28 g./min. and a die pressure of about 25-29 MPa (3700-4200 psi), depending on the exact die gap. Experiments were carried out in a sequence of unmodified resin, followed by resin containing the fluoropolymer process aid. When changing the feed composition, the initial output parameters corresponded to the previous equilibrium, and then gradually changed to a new equilibrium, judged to be reached when the die pressure was constant for one hour. When equilibrium was achieved for each composition, a range of screw speeds was then run to produce new equilibrium values of throughput and die pressure. Surface quality of the extrudate was judged by visual examination.

After each series of examples the die inserts were removed and the extruder was purged for approximately 30 min. with a 50% mixture of talc in LLDPE following which the extruder and die body were then completely disassembled. The screw, barrel, die assembly, transducers and thermocouples were thoroughly cleaned, first with a motor driven brass brush, and finally with acetone solvent An extrusion test for equilibrium parameter values was then carried out as described above.

The materials used in the examples are as follows:

The linear low density polyethylene (LLDPE) was a high molecular weight, linear low density (d=0.918) copolymer of ethylene and butene-1 having a melt index (ASTM D-1238, cond. E) of 1.0.

The fluoroelastomers, that is, the (b)(1) component of the blend composition of the invention, were commercially available from E. I. du Pont de Nemours and Company and had compositions and the viscosity characteristics given in Table I. Mooney Viscosities were determined by ASTM D-I646 (large rotor, 121° C., 1 minute warmup, 10 min. measurement; referred to in Table 1 as "ML(1+10)'"). Apparent viscosities at 360 KPa, measured at 200.C, were determined by standard piston rheometry using 0.38, 0.76 and 2.54 mm (0.015, 0.03 and 0.1 in.) capillary dies having length to diameter (L/D) ratios of 16/1 and 2/1 for end corrections.

The irradiated tetrafluoroethylene (TFE) homopolymer was obtained by subjecting a high molecular weight, fine powder TFE homopolymer to 10 Mrads of ionizing radiation as described in U.S. Pat. No. 3,766,031. It had a differential scanning calorimetry (DSC) melting point at 323° C., a melt viscosity of $2 \times 10^4$ N.s/$m^2$, an average particle size of 11 μm, and contained —COOH and —COF end groups.

The fluorinated ethylene propylene (FEP) copolymer was composed of copolymerized units of TFE and 12 wt. % hexafluoropropylene, had a molecular weight of approximately 90,000, a DSC melting point maximum in the range 250-280° C and contained carboxyl end groups.

Masterbatches of 50/50 mixtures of the type (1) and type (2) components of the process aid in LLDPE were prepared at a total concentration of fluoropolymers of 1.25 wt. %, using a co-rotating twin screw extruder at 200 rpm and 140° C; they also contained 0.1 wt. % of Irganox ® 1010 antioxidant. The masterbatches were pelletized and mechanically mixed, before extrusion, with LLDPE pellets to a total letdown concentration of fluoropolymer of 0.0500%.

The abrasive filler (antiblock) used was a natural silica: Superflos ® (Johns Manville) or its equivalent supplied as a 20 wt. % masterbatch in polyethylene by Ampicet Corp. It was added to the LLDPE as a 20% masterbatch to give a letdown concentration of 0.5%.

EXAMPLES

Comparative Example 1

(A) The extruder was fed unmodified LLDPE with the screw operating at 60 rpm and heating zones No. 1–4 controlling at nominal temperature settings (°C) of 150, 180, 200 and 204, respectively. Equilibrium extrusion conditions, where throughput and die pressure were constant, were reached after a period of 30 min. The screw speed was then systematically varied from 20 rpm to 120 rpm. After determining the extrusion rate at various screw speeds, the data were input to a computer program that generated a relationship between throughput and die pressure from which a set of standard extrusion rates could be selected for comparison of die pressure data, as shown in Table 2. Surface appearance of the die strand was evaluated visually. Melt fracture occurred at all extrusion rates in excess of 8 g./min., the lowest rate attainable on the equipment. For purposes of comparison in these examples, "melt fracture" is defined as a herringbone-like roughness on the surface of the extrudates.

(B) Without changing conditions, and at 60 rpm, the extruder feed was changed to a blend containing 0.025 part each, by weight, of Fluoroelastomer A and FEP polymer. After the new equilibrium was established, and in a procedure as described in (A) a new relationship of die pressure and extrusion rate was generated as shown in Table 2. Melt fracture did not occur up to a maximum extrusion rate attainable of about 52 g/min. For each data point the percent change (drop) in die pressure was calculated, as shown, and then averaged.

(C) In a similar fashion, a blend of the same fluoropolymers as in (B), but additionally containing 0.5% of silica was extruded and the data analyzed as in (B). Although melt fracture did not occur in the range tested, there was a significant decrease in the amount of pressure drop relative to the unmodified LLDPE, compared to that in (B). Data are also summarized in Table 3.

EXAMPLE 1

This example was carried out as in Comparative Example 1, except that Fluoroelastomer B was used. Data are shown in Table 3.

EXAMPLE 2

This example was performed as in Comparative Example 1 and Example 1, except that Fluoroelastomer C was used. Data are presented in Table 3, and show that, although the pressure changes are about the same for all fluoroelastomers in the absence of filler, Fluoroelastomers B and C retain a significantly higher ΔP in the presence of filler.

Comparative Example 2 and Example 3

These examples were carried out as in Comparative Example 1 and Example 1, respectively, except that the (b)(2) component of the blend composition of the invention was the irradiated TFE homopolymer described above. Data are given in Table 3.

EXAMPLE 4

Extrusions were carried out as in Example 1 and Comparative Example 2, except that the (b)(1) component of the blend composition of the invention was Fluoroelastomer C. Data are given in Table 3, and show that blends containing Fluoroelastomer C retain a significantly higher ΔP in the presence of the silica additive.

EXAMPLE 5

Extrusions were carried out as in Example 4 at an overall concentration of 0.05 wt. % fluoropolymers (b)(1) and (b)(2), but at varying ratios of relative percentages of Fluoroelastomer C to irradiated TFE homopolymer. Feed mixtures to the extruder were prepared by blending dry powders of the fluoropolymers with the LLDPE resin. Data are given in Table 4.

TABLE 1

| Fluoroelastomer Composition | Fluoroelastomer | | |
|---|---|---|---|
| | A | B | C |
| vinylidene fluoride, wt. % | 60 | 45 | 60 |
| hexafluoropropylene, wt. % | 40 | 30 | 40 |
| tetrafluoroethylene, wt. % | — | 25 | — |
| ML (1 + 10) at 121° C. | 38 | 78 | 150* |
| η$_{app}$ (Pa.s) | 124 | 414 | 4440 |

*approximate

TABLE 2

| | Comparative Example 1 | | | | |
|---|---|---|---|---|---|
| | | B | | C | |
| Extrusion Rate g/min | A MPa | MPa | ΔP % | MPa | ΔP % |
| 15.0 | 20.7 | 12.5 | 39.7 | 16.3 | 21.5 |
| 23.8 | 24.7 | 15.9 | 35.9 | 18.9 | 23.4 |
| 32.5 | 25.4 | 18.8 | 25.8 | 21.4 | 15.7 |
| 41.3 | 29.5 | 21.5 | 27.2 | 23.7 | 19.6 |
| 50.0 | 30.9 | 23.3 | 24.4 | 25.3 | 18.1 |
| ΔP (average) | | | 31.7 | | 20.9 |

TABLE 3

| | Fluoroelastomer | | |
|---|---|---|---|
| | A | B | C |
| | ΔP (MPa) (average) | | |
| Comp. Ex. 1(B) | 31.7 | — | — |
| 1(C) | 20.9 | — | — |
| Ex. 1(B) | — | 34.1 | — |
| 1(C) | — | 26.2 | — |
| Example 2(B) | — | — | 32.4 |
| 2(C) | — | — | 30.5 |
| Comp. Ex. 2(B) | 31.6 | — | — |
| 2(C) | 20.5 | — | — |
| Ex. 3(B) | — | 40.8 | — |
| 3(C) | — | 23.6 | — |
| Example 4(B) | — | — | 37.8 |
| 4(C) | — | — | 29.6 |

TABLE 4

| Ratio of Fluoroelastomer C/ | ΔP (MPa) | |
|---|---|---|
| Irr. TFE polymer | Step (B) | Step (C) |
| 75/25 | 33.3 | 28.8 |
| 67/33 | 32.7 | 27.5 |
| 50/50 | 36.8 | 28.7 |
| 33/67 | 40.0 | 28.1 |
| 25/75 | 42.2 | 24.9 |

The foregoing description is intended as an explanation of the invention to one skilled in the art. It is not intended or to be interpreted as a limitation on the scope of the invention, embodiments of which as claimed hereinafter are hereby incorporated by reference.

We claim:

1. Improved polymer blend composition having improved processibility and comprising:
   (a) a major portion of a difficultly melt-processible polymer, and
   (b) a minor portion of:
      (1) at least an effective amount, to improve processibility, of a fluorocarbon copolymer which at the melt-processing temperature of (a) is either in a melted form if crystalline, or is above its glass transition temperature if amorphous, and
      (2) at least an effective amount, to improve processibility, of at least one tetrafluoroethylene homopolymer or copolymer of tetrafluoroethylene and at least one monomer copolymerizable therewith, wherein the mole ratio of fluorine to hydrogen is at least 1:1, and which is solid at the melt processing temperature of
   (a), said composition further characterized in that it contains an abrasive inorganic filler that retards the processibility of (a) in the presence of (b)(1) and (b)(2), the improvement consisting of minimizing the retarding effect of the inorganic filler by employing (b)(1) having an apparent viscosity at 200 C of at least about 400 Pa.s measured at an apparent shear stress of 360 KPa.

2. Composition of claim 1 wherein the apparent viscosity of (b)(1) is at least about 1000 Pa.s.

3. Composition of claim 1 wherein the apparent viscosity of (b)(1) is at least about 2000 Pa.s.

4. Composition of claim 1 wherein (a) is a hydrocarbon polymer.

5. Composition of claim 4 wherein the hydrocarbon polymer is a homopolymer or copolymer of one or more monoolefins of the formula RCH=CH$_2$ wherein R is H or alkyl.

6. Composition of claim 5 wherein alkyl is a C$_{1-8}$ alkyl.

7. Composition of claim 5 wherein the hydrocarbon polymer is low density polyethylene.

8. Composition of claim 5 wherein the hydrocarbon polymer is high density polyethylene.

9. Composition of claim 5 wherein the hydrocarbon polymer is linear low density polyethylene.

10. Composition of claim 5 wherein the hydrocarbon polymer is a copolymer of ethylene. propylene and a non-conjugated diene.

11. Composition of claim 1 wherein the amount of (b)(1) is 0.005–0.5 wt. % based on the amount of (a).

12. Composition of claim 1 wherein the amount of (b)(1) is 0.005–0.1 wt. % based on the amount of (a).

13. Composition of claim 1 wherein component (b)(1) is a fluorocarbon copolymer of vinylidene fluoride, hexafluoropropylene, chlorotrifluoroethylene, tetrafluoroethylene or a perfluoroalkyl perfluorovinyl ether.

14. Composition of claim 13 wherein component (b)(1) is a copolymer of vinylidene fluoride and a monomer selected from hexafluoropropylene, chlorotrifluoroethylene, 1-hydropentafluoropropylene and 2-hydropentafluoropropylene; a copolymer of vinylidene fluoride, tetrafluoroethylene and hexafluoropropylene or 1- or 2-hydropentafluoropropylene; or a copolymer of tetrafluoroethylene and propylene.

15. Composition of claim 1 wherein (b)(1) is a copolymer of vinylidene fluoride and hexafluoropropylene.

16. Composition of claim 15 wherein (b)(1) is a copolymer of vinylidene fluoride, hexafluoropropylene and tetrafluoroethylene.

17. Composition of claim 1 wherein (b)(1) is a copolymer of tetrafluoroethylene and a perfluoro(alkyl vinyl ether).

18. Composition of claim 17 wherein the perfluoro(alkyl vinyl ether) is perfluoro(methyl vinyl ether).

19. Composition of claim 1 wherein the amount of (b)(2) is 0.005-0.5 wt. % based on the amount of (a).

20. Composition of claim 1 wherein the amount of (b)(2) is 0.005-0.1 wt. % based on the amount of (a).

21. Composition of claim 1 wherein (b)(2) is polytetrafluoroethylene.

22. Composition of claim 21 wherein the polytetrafluoroethylene is substantially non-fibrillating.

23. Composition of claim 21 wherein the polytetrafluoroethylene has been subjected to ionizing radiation.

24. Composition of claim I wherein (b)(2) is a copolymer of tetrafluoroethylene and one or more monomers selected from a perfluoroolefin, a perfluoro(alkyl vinyl ether) and a perfluoro(alkyl vinyl ether) containing a functional group.

25. Composition of claim 1 wherein component (b)(2) is a copolymer of tetrafluoroethylene and ethylene.

26. Composition of claim 24 wherein the monomer is hexafluoropropylene.

27. Composition of claim 24 wherein the monomer is perfluoro(propyl vinyl ether).

28. Composition of claim 24 wherein the functional group is $-SO_2F$ or $-CO_2CH_3$.

29. Composition of claim 1 wherein the abrasive inorganic filler is an antiblocking agent.

30. Composition of claim 29 wherein the antiblocking agent is silica.

31. Composition of claim 29 wherein the antiblocking agent is a powdered clay.

32. Composition of claim 1 wherein the abrasive inorganic filler is a pigment.

33. Processing aid composition for a difficultly melt-processible polymer that contains an abrasive inorganic filler, said composition consisting essentially of:
 (a) at least 90 wt. % of a polymer that is compatible with the difficultly melt-processible polymer and
 (b) up to 10 wt. % of, with the parts totaling 100 %:
  (1) 5-95 parts by weight of a fluorocarbon copolymer which has an apparent viscosity at 200° C of at least about 400 Pa.s measured at an apparent shear stress of 360 KPa and which at the melt-processing temperature of the difficultly melt-processible polymer is either in a melted form if crystalline or is above its glass transition temperature if amorphous; and
  (2) 95-5 parts by weight of a tetrafluoroethylene homopolymer or copolymer of tetrafluoroethylene and a monomer which is copolymerizable therewith, wherein the mole ratio of fluorine to hydrogen is at least 1:1, and which is solid at the melt-processing temperature of the difficultly melt-processible polymer.

34. Composition of claim 33 wherein the apparent viscosity of (b)(1) is at least about 1000 Pa.s.

35. Composition of claim 33 wherein the apparent viscosity of (b)(1) is at least about 2000 Pa.s.

36. Composition of claim 33 wherein (a) is a hydrocarbon polymer.

37. Composition of claim 33 wherein the combined amounts of component (b)(1) and component (b)(2) comprise 1-3 wt. % of the composition.

38. Composition of claim 36 wherein the hydrocarbon polymer is a difficultly melt-processible polymer.

39. Composition of claim 36 wherein the hydrocarbon polymer is a homopolymer or copolymer of one or more monoolefins of the formula $RCH=CH_2$ wherein R is H or alkyl.

40. Composition of claim 39 wherein alkyl is $C_1$-8 alkyl.

41. Composition of claim 33 wherein the amount of component (b)(1) is 20:80 parts and the amount of component (b)(2) is 90:10 parts.

42. Composition of claim 33 wherein the mole ratio of fluorine to hydrogen in component (b)(1) is at least 1:1.5.

43. Composition of claim 33 wherein component (b)(1) is a fluorocarbon copolymer of vinylidene fluoride, hexafluoropropylene, chlorotrifluoroethylene, tetrafluoroethylene or a perfluoroalkyl perfluorovinyl ether.

44. Composition of claim 43 wherein component (b)(1) is a copolymer of vinylidene fluoride and a monomer selected from hexafluoropropylene, chlorotrifluoroethylene, 1-hydropentafluoropropylene and 2-hydropentafluoropropylene; a copolymer of vinylidene fluoride, tetrafluoroethylene and hexafluoropropylene or 1- or 2-hydropentafluoropropylene; or a copolymer of tetrafluoroethylene and propylene.

45. Composition of claim 33 wherein (b)(1) is a copolymer of vinylidene fluoride and hexafluoropropylene.

46. Composition of claim 45 wherein (b)(1) is a copolymer of vinylidene fluoride, hexafluoropropylene and tetrafluoroethylene.

47. Composition of claim 33 wherein component (b)(2) is polytetrafluoroethylene.

48. Composition of claim 47 wherein the polytetrafluoroethylene is substantially non-fibrillating.

49. Composition of claim 47 wherein the polytetrafluoroethylene has been subjected to ionizing radiation.

50. Composition of claim 33 wherein component (b)(2) is a copolymer of tetrafluoroethylene and one or more monomers selected from a perfluoroolefin, a perfluoro(alkyl vinyl ether) and a perfluoro(alkyl vinyl ether) containing a functional group.

51. Composition of claim 33 wherein component (b)(2) is a copolymer of tetrafluoroethylene and ethylene.

52. Composition of claim 50 wherein the monomer is hexafluoropropylene.

53. Composition of claim 50 wherein the monomer is perfluoro(propyl vinyl ether).

54. Composition of claim 50 wherein the functional group is $-SO_2F$ or $-CO_2CH_3$.

55. Improved extrusion process comprising melt extruding a difficultly melt-processible polymer having incorporated therein an effective amount, to improve processability, of a processing aid consisting essentially of, with the parts totaling 100 parts:

(a) 5-95 parts by weight of a fluorocarbon copolymer which at the melt-processing temperature of the difficultly melt-processible polymer is either in a melted form if crystalline or is above its glass transition temperature if amorphous; and (b) 95-5 parts by weight of a tetrafluoroethylene homopolymer or copolymer of tetrafluoroethylene and a monomer which is copolymerizable therewith, wherein the mole ratio of fluorine to hydrogen is at least 1:1, and which is solid at the melt-processing temperature of the difficultly melt-processible polymer, said difficultly melt-processible polymer also having incorporated therein an abrasive inorganic filler that retards its processibility in the presence of (a) and (b), the improvement consisting of minimizing the retarding effect of the inorganic filler by employing (a) having an apparent viscosity at 200.C of at least about 400 Pa s measured at an apparent shear stress of 360 KPa.

56. Process of claim 55 wherein the apparent viscosity of (a) is at least about 1000 Pa.s.

57. Process of claim 55 wherein the apparent viscosity of (a) is at least about 2000 Pa.s.

58. Process of claim 55 wherein the difficulty melt-processible polymer is a hydrocarbon polymer.

59. Process of claim 55 wherein the mole ratio of fluorine to hydrogen in component (a) is at least 1:1.5.

60. Process of claim 55 wherein component (a) is a fluorocarbon copolymer of vinylidene fluoride, hexafluoropropylene, chlorotrifluoroethylene, tetrafluoroethylene or a perfluoroalkyl perfluorovinyl ether.

61. Process of claim 60 wherein component (a) is a copolymer of vinylidene fluoride and a monomer selected from hexafluoropropylene, chlorotrifluoroethylene, 1-hydropentafluoropropylene and 2-hydropentafluoropropylene; a copolymer of vinylidene fluoride, tetrafluoroethylene and hexafluoropropylene or 1- or 2-hydropentafluoropropylene; or a copolymer of tetrafluoroethylene and propylene.

62. Process of claim 55 wherein (a) is a copolymer of vinylidene fluoride and hexafluoropropylene.

63. Process of claim 62 wherein (a) is a copolymer of vinylidene fluoride, hexafluoropropylene and tetrafluoroethylene.

64. Process of claim 55 wherein component (b) is polytetrafluoroethylene.

65. Composition of claim 64 wherein the polytetrafluoroethylene is substantially non-fibrillating.

66. Composition of claim 64 wherein the polytetrafluoroethylene has been subjected to ionizing radiation.

67. Process of claim 55 wherein component (b) is a copolymer of tetrafluoroethylene and one or more monomers selected from a perfluoroolefin, a perfluoro(alkyl vinyl ether) or a perfluoro(alkyl vinyl ether) containing a functional group.

68. Process of claim 55 wherein component (b) is a copolymer of tetrafluoroethylene and ethylene.

69. Process of claim 67 wherein the monomer is hexafluoropropylene.

70. Process of claim 67 wherein the monomer is perfluoro(propyl vinyl ether).

71. Process of claim 67 wherein the functional group is $-SO_2F$ or $-CO_2CH_3$.

72. Process of claim 55 wherein the amount of component (a) is 20-80 parts and the amount of component (b) is 90-10 parts.

* * * * *

UNITED STATES PATENT AND TRADEMARK OFFICE
CERTIFICATE OF CORRECTION

PATENT NO. : 5,010,130

DATED : April 23, 1991

INVENTOR(S) : Chapman, Jr. et al.

It is certified that error appears in the above-identified patent and that said Letters Patent is hereby corrected as shown below:

COLUMN 10;

Claim 1, lines 38 and 39   replace "200 C" with --200°C--.

Claim 10, line 2, replace "ethylene.propylene" with --ethylene, propylene--.

COLUMN 13;

Claim 55, line 21, replace "200.C" with --200°C--.

Claim 55, line 22, replace "Pa s" with --Pa.s--.

Signed and Sealed this

Twenty-ninth Day of September, 1992

Attest:

DOUGLAS B. COMER

*Attesting Officer*   Acting Commissioner of Patents and Trademarks